(12) United States Patent
Joret et al.

(10) Patent No.: US 8,869,506 B2
(45) Date of Patent: Oct. 28, 2014

(54) TURBOJET ENGINE NACELLE INCLUDING A DEVICE FOR ABSORBING CIRCUMFERENTIAL STRESSES

(71) Applicant: Aircelle, Gonfreville l'Orcher (FR)

(72) Inventors: Jean-Philippe Joret, Beuzeville (FR); Peter Segat, Le Havre (FR); Guy Bernard Vauchel, Harfleur (FR); Georges Alain Bouret, Epouville (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 13/692,227

(22) Filed: Dec. 3, 2012

(65) Prior Publication Data

US 2013/0091825 A1   Apr. 18, 2013

Related U.S. Application Data

(63) Continuation of application No. PCT/FR2011/051212, filed on May 27, 2011.

(30) Foreign Application Priority Data

Jun. 3, 2010 (FR) ..................... 10 54323

(51) Int. Cl.
*F02K 1/80* (2006.01)
*F02K 1/70* (2006.01)
*B64D 29/06* (2006.01)
*F02K 1/76* (2006.01)

(52) U.S. Cl.
CPC . *F02K 1/70* (2013.01); *F02K 1/766* (2013.01); *B64D 29/06* (2013.01)
USPC .................. 60/226.2; 60/230; 244/110 B (58) Field of Classification Search
CPC ......... F02K 1/763; F02K 1/766; B64D 29/06; B64D 29/08
USPC ............... 60/226.2, 226.3, 230; 244/110 B; 292/95, 96, 99, 116, 117, 119, 120
See application file for complete search history.

(56) References Cited

U.S. PATENT DOCUMENTS 3,541,794 A * 11/1970 Bollenbacher et al. ...... 60/226.2
3,750,983 A * 8/1973 Morris ........................... 244/54

(Continued)

FOREIGN PATENT DOCUMENTS

FR    2914700    10/2008
FR    2920177    2/2009

(Continued)

OTHER PUBLICATIONS

PCT/FR2011/051212 International Search Report.

*Primary Examiner* — William H Rodriguez
*Assistant Examiner* — Lorne Meade
(74) *Attorney, Agent, or Firm* — Brinks Gilson & Lione (57) ABSTRACT

A nacelle for a turbojet engine of an aircraft is provided that includes a fan case, an internal structure positioned upstream from the fan case, and a thrust reverser positioned downstream from the fan case. The thrust reverser includes a cowl delimiting an external line (LE) and including two removable half cowls. A device for absorbing circumferential stresses are shaped so as to lock the half cowls in the closed position when it occupies a locking configuration on the one hand and for allowing the opening of the half cowls when it occupies an unlocking configuration on the other hand. The stress absorbing device is positioned under an upstream portion of a pylon and is exclusively attached to the half cowls in order to allow the opening of the two half cowls independently of the opening/closing of an external fan cowl.

7 Claims, 6 Drawing Sheets

(56) References Cited

U.S. PATENT DOCUMENTS

| | | | | |
|---|---|---|---|---|
| 4,421,349 A | * | 12/1983 | Greiert, Jr. | 292/19 |
| 4,549,708 A | * | 10/1985 | Norris | 244/129.4 |
| 4,585,189 A | | 4/1986 | Buxton | |
| 4,679,750 A | | 7/1987 | Burhans | |
| 4,683,717 A | * | 8/1987 | Naud | 60/226.1 |
| 5,350,136 A | * | 9/1994 | Prosser et al. | 244/129.4 |
| 6,189,832 B1 | * | 2/2001 | Jackson | 244/129.4 |
| 6,517,027 B1 | * | 2/2003 | Abruzzese | 244/129.4 |
| 6,843,449 B1 | * | 1/2005 | Manteiga et al. | 244/54 |
| 7,275,362 B2 | * | 10/2007 | Strunk et al. | 60/226.2 |
| 8,573,928 B2 | * | 11/2013 | Soulier et al. | 415/126 |
| 2005/0024815 A1 | * | 2/2005 | Pratt | 361/600 |
| 2009/0165463 A1 | * | 7/2009 | Vauchel et al. | 60/797 |
| 2010/0206981 A1 | * | 8/2010 | Baillard | 244/54 |
| 2010/0287910 A1 | * | 11/2010 | Joret et al. | 60/226.2 |

FOREIGN PATENT DOCUMENTS

| | | | | |
|---|---|---|---|---|
| WO | 99/51490 | | 10/1999 | |
| WO | WO2009024431 | * | 2/2009 | B64D 29/06 |

* cited by examiner

TURBOJET ENGINE NACELLE INCLUDING A DEVICE FOR ABSORBING CIRCUMFERENTIAL STRESSES

CROSS-REFERENCE TO RELATED APPLICATIONS

This application is a continuation of International Application No. PCT/FR2011/051212 filed on May 27, 2011, which claims the benefit of FR 10/54323, filed on Jun. 3, 2010. The disclosures of the above applications are incorporated herein by reference.

FIELD

The present disclosure relates to a nacelle for an aircraft turbojet engine.

BACKGROUND

The statements in this section merely provide background information related to the present disclosure and may not constitute prior art.

Figure 1:
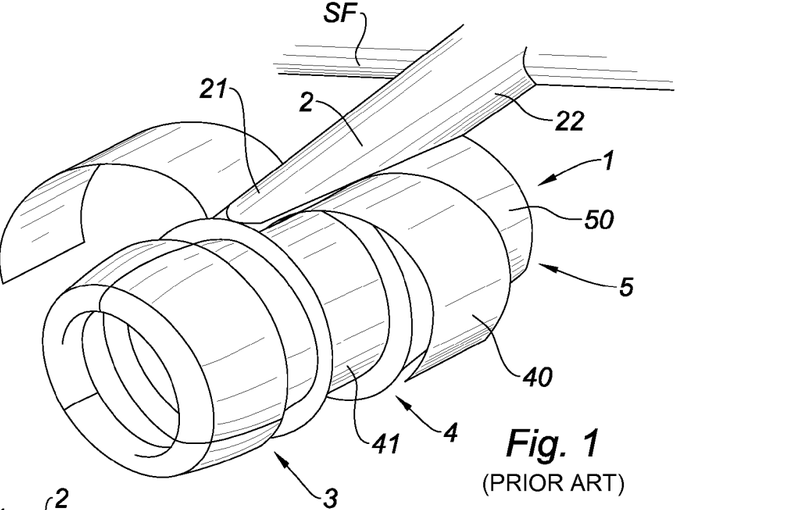
FIG. 1, having already been the subject of comments, is a schematic perspective view of a conventional nacelle supported by a pylon.

Conventionally and as illustrated in FIG. 1, a nacelle 1 may be attached to a fixed structure SF of an aircraft or airplane, such as a wing, via a pylon or mast 2. The nacelle 1 has a structure comprising an air intake section 3 upstream, a middle section for surrounding a fan (not visible) of the turbojet engine, and a downstream section 5 surrounding the turbojet engine and harboring a thrust reverser 50.

The middle section 4 includes a case 41, a so-called fan case, attached at its upstream end to the air intake structure 3 and at its downstream end to the downstream section 5 and thus to the thrust reverser 50; this fan case 41 being surrounded by an external fan cowl 40. The fan case 41 is directly attached on the upstream portion 21 of the pylon 2, while the downstream portion 22 of the pylon 2 is attached on the wing SF. The downstream section 5 further includes an internal structure (not visible) surrounding the turbojet engine and partly defining a ring shaped vein for letting through an airflow, this internal structure delimiting an internal line of this ring shaped vein.

For reasons of mass and of congestion with the external aerodynamic lines of the nacelle 1, the pylon 2 has in its upstream portion 21 a relatively thin or not very thick structure, comparatively with its downstream portion 22.

Figure 2:
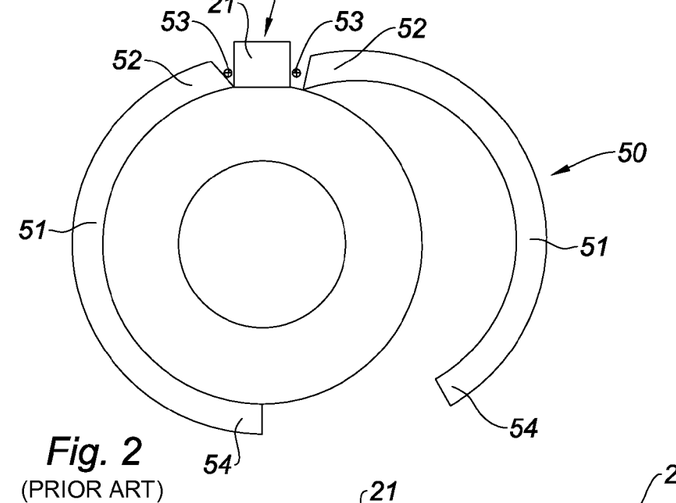
FIG. 2, having already been the subject of comments, is a schematic cross-sectional view of a conventional nacelle supported by a pylon, in a sectional plane of the thrust reverser.
Figure 3:
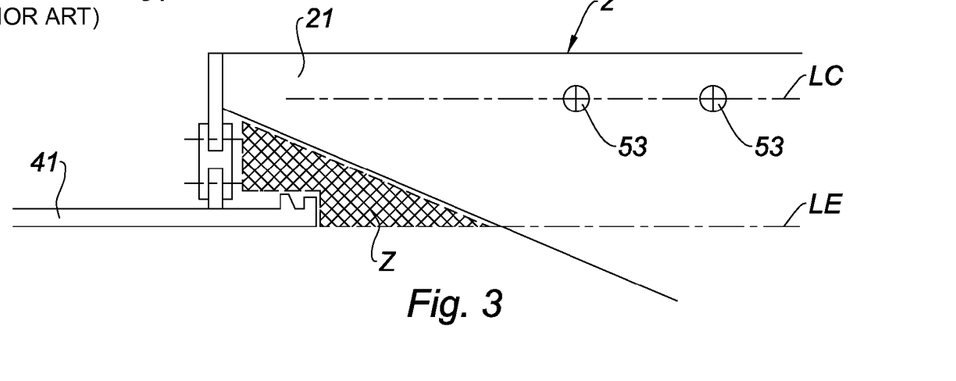
FIG. 3 is a schematic partial side view of the nacelle of FIG. 2, illustrating the downstream end of the fan case and the upper portion of the pylon.

As illustrated in FIG. 2, in the majority of applications on airplanes and notably in applications of a turbojet engine under a wing, the thrust reverser 50 comprises a cowl defining with the internal structure the ring shaped vein, this cowl delimiting an external line LE (visible in FIG. 3) of this ring shaped vein. Conventionally, the thrust reverser 50 in the closed position is maintained on the downstream end of the fan case 41 by a knife system inserted in a groove (not illustrated).

The cowl of the thrust reverser 50 includes two removable half cowls 51 respectively having upper edges 52 equipped with means 53 for jointing the half-cowls 51 on the pylon 2. These jointing means 53 are shaped so as to allow pivoting of the half-cowls 51 between closed and open positions around respective longitudinal axes forming hinge lines LC. Conventionally, the joint of the half-cowls 51 on the pylon 2 is made by means of floating connecting rods 53 which define the hinge lines LC.

Both half cowls 51 also have free lower edges 54, opposite to the upper edges 52, which are generally provided with lower locking means (not illustrated such as for example a lock or hook system) designed so as to keep the half cowl 51 closed in the lower portion of the nacelle 1 (at 6 o'clock). These lower locking means may for example be actuated by a lower locking handle positioned on one of the lower edges 54 and movable between a locking position and an unlocking position for the lower locking means.

The arrangement of the hinge lines LC allowing the opening of the half cowls 51 required for maintenance operations, should, in a wide upstream portion of the half-cowl 51, not interfere with the hooking up of a thrust reverser 50 on the fan case 41, with the risk of having a hyperstatic assembly and thereby generating parasitic and detrimental stresses between the thrust reverser 50 and the fan case 41.

In order to rigidly bind the half cowls 51 to each other without interfering with the upstream hooking up of the half cowls 51 on the fan case 41, the floating connecting rods 53 are installed through the pylon 2, downstream from the upstream portion 21 (as is visible in FIG. 3) wherein the pylon 2 is sufficiently thick for supporting a structural failure induced by the openings crossed by the connecting rods 53. The floating connecting rods 53 are conventionally mounted with play through the pylon 2, in order not to interfere during relative movements of the different structures of the nacelle 1.

Now, in the case of a substantial displacement of the nacelle, there exists a risk of detaching the hooking up of the half cowls of the thrust reverser on the fan case, as this may be observed in a situation of fan blade breakage which generates very large displacements of the nacelle due to the unbalance generated by the off-balance of the shaft of the turbojet engine.

The state of the art may be illustrated by the teaching of document U.S. Pat. No. 4,679,750 A which discloses a nacelle including an upper safety system (upper latch assembly) which connects together the upper edges of the half cowls of the thrust reverser and which is shaped in order to lock these half cowls in the closed position when it occupies a locking configuration and for allowing opening of the half cowls when it occupies an unlocking configuration.

However, this upper safety system is also attached to the two external fan half cowls (fan cowl) via a connecting rod slidably mounted in the groove of a guide mounted on the external fan half cowls. Thus, this upper safety system gives the possibility of opening the half cowls of the thrust reverser only when the external fan half cowls are open.

SUMMARY

The present disclosure includes a nacelle equipped with a sufficiently strong mechanical link between both half cowls of the thrust reverser in order to be able to absorb the stresses which would tend to separate these half cowls from each other and to break the attachment of the half cowls on the fan case.

The nacelle is equipped with such a mechanical link between the half cowls which is positioned sufficiently close to the upstream end of the half cowls, as close as possible to the tie of the half cowls on the fan case, in order to not risk detaching the attachment of the thrust reverser on the fan case under very large displacements, notably during a fan blade failure.

The nacelle is also equipped with a mechanical link between the half cowls which is sufficiently close to the upstream end of the half cowls, which does not require piercing or crossing of the pylon at its upstream portion. Indeed, in this relatively thin upstream portion of the pylon, the structure of the pylon would risk not mechanically withstanding a structural continuity failure induced by an opening.

Additionally, the nacelle is equipped with a mechanical link between the half cowls which allows locking of the half cowls upon closing and allowing the half cowls to be opened, independently of the opening/closing situation of the external fan cowl.

For this purpose, the present disclosure includes a nacelle for a turbojet engine of an aircraft, including:
- a fan case intended to surround a fan upstream from the turbojet engine, said fan case being surrounded by an external fan cowl and being attached onto a pylon supporting the nacelle;
- an internal structure positioned downstream from the fan case and intended to surround the turbojet engine; and
- a thrust reverser positioned downstream from the fan case and comprising a cowl defining with the internal structure a ring shaped vein for letting through an airflow, said cowl delimiting an external line of said ring shaped vein and including two removable half-cowls respectively having upper edges equipped with means for jointing the half cowls on the pylon, said jointing means being shaped so as to allow pivoting of the half cowls between closed and open positions around respective longitudinal axes forming hinge lines; and
- a device for absorbing circumferential stresses connecting together the upper edges of the half cowls, said stress absorbing device being shaped so as to lock the half cowls in the closed position when it occupies a locking configuration on the one hand and to allow the opening of the half cowls when it occupies an unlocking configuration on the other hand, the nacelle according to the present disclosure being remarkable in that the stress absorbing device is positioned under an upstream portion of the pylon, upstream from the means for jointing the half cowls on the pylon, and is inserted between the external line of the ring shaped vein and the two hinge lines, and in that the stress absorbing device is exclusively attached to the half cowls in order to allow the opening of the two half cowls independently of the opening/closing of the external fan cowl.

Thus, the stress absorbing device is positioned under the upstream portion of the pylon, shifted relatively to the hinge lines and above the external line of the ring shaped vein, so that it is located sufficiently close to the upstream end of the half cowls, as close as possible to the tie of the half cowls on the fan case, while forming a sufficiently strong mechanical link (in its locking configuration/position) in order to absorb the stresses which would tend to separate these half cowls from each other. This stress absorbing device transversely connects the upper edges of the half cowls, so that it is mounted in the upper (or high) portion of the nacelle at 12 o'clock.

Further, the stress absorbing device is not attached to the external fan cowl and its operation is independent of the opening/closing situation of this external fan cowl.

According to one feature, the fan case has at its downstream end, upper means for attaching said fan case on the upstream portion of the pylon, and the stress absorbing device is positioned between said upper attachment means and the jointing means.

In a particular form, the stress absorbing device includes at least one actuator equipped with a rod slidably mounted in a hollow body between a retracted position in the body and a deployed position out of the body, said rod having a first end attached on the upper edge of one of the half cowls and a second opposite end extending into the body, said body having a first end provided with an orifice for letting through the rod and a second opposite end attached onto the upper end of the other half cowl, and the actuator further includes locking/unlocking means cooperating with the rod in order to not lock/unlock the rod in the retracted position.

In this form, the actuator may correspond to an actuator system with constant links, it being understood that such a system of an actuator with constant links designates a permanently attached actuator on both half cowls of the thrust reverser, so that it is not necessary to dismantle one of the attachments of the actuator in order to allow the opening of the half cowls of the thrust reverser, the maneuver for opening the half cowls being allowed by the internal system of the actuator during the release or exit of the actuator rod.

The installation of the actuator on the half cowls may be accomplished at the same time as the mounting of the means for jointing the half cowls on the pylon, in the upper portion for the nacelle (at 12 o'clock). The control for unlocking the locking/unlocking means of the actuator is preferably accomplished remotely since the actuator once it is installed, is difficult to access just like the hinge lines defined by the jointing means.

According to a possibility of the present disclosure, the locking/unlocking means include:
- blocking means positioned in the body and cooperating with the rod, and notably with the second end of the rod, for blocking the latter in its retracted position, said blocking means being movably mounted in the body between a blocking position and unblocking position for the rod; and
- driving means designed for driving the displacement the blocking means between the blocking and unblocking positions and vice versa.

According to other advantageous characteristics of this form with blocking means and driving means:
- the blocking means include at least one part forming a hook having a free end designed for cooperating with the second end of the rod, said part forming a hook being translationally movable in the body between the blocking position in which the free end of the part forming a hook cooperates with the second end of the rod and the unblocking position in which the free end of the part forming a hook is moved away from the second end of the rod and allows displacement of the rod;
- the rod is at least partly threaded, the blocking means include a nut mounted on the threading of the rod inside the body and the driving means include a rotary motor designed for driving the rod into rotation;
- the rotary motor is controlled by a system for opening the two half cowls of the thrust reverser so that the speed of rotation of the rod imposed by the rotary motor allows the nut to be driven into translation more rapidly than the opening of both half cowls by the opening system, thus the rotary motor of the actuator allows a disengagement advance of the internal nut so that the latter does not interfere during the opening sequence of the half cowls; or alternatively
- the rotary motor is independent of a system for opening the system of both half cowls of the thrust reverser, and the rod has on its second end a part forming an abutment for the nut, and in this case the rotary motor of the actuator performs the complete maneuver for disengaging the nut before starting the sequence for opening the half cowls.

For this form with an actuator, the present disclosure also relates to the features hereafter:
- the actuator locks the half cowls in an optional direction, either in compression (direction for retracting the rod) or in extension (direction for moving out or releasing the rod) with respect to the axis of the actuator, according to the need of one skilled in the art, or alternatively the actuator locks the half cowl in both directions simultaneously (both in compression and in extension);

the actuator is with a lock and/or electric drive, or alternatively the actuator is with a lock and/or a mechanical drive;

the actuator is with a remote lock;

the actuator is coupled with a system for opening the half cowls, and more particularly coupled with the logic for opening the half cowls;

the actuator has locking means for the purpose of closing, these locking means with a closing purpose, being preferably shaped in order to assist with the maneuver for closing the half cowl;

the actuator is associated with a maneuvering system for opening the half cowls simultaneously, and in this case the motor of the actuator (for driving the rod) is maneuvered at the same time as the control for opening the half cowls of the thrust reverser; or alternatively the actuator is associated with a maneuvering system for opening the half cowls in a sequential mode, and in this case the motor of the actuator (for driving the rod) is maneuvered before controlling the opening of the half cowls of the thrust reverser.

In another form, the stress absorbing device includes at least one lock system provided with:

a hook mounted on the upper edge of one of the half cowls;

a hooking-up member mounted on the upper edge of the other half cowl, said hook being movable between a locking position in which the hook restrainedly cooperates with the hooking-up member in the closed or substantially closed position of the half cowls, and an unlocking position in which the hook does not cooperate with the hooking-up member and allows opening of the half cowls; and means for actuating said hook between the locking and unlocking positions.

In this form, the lock system corresponds to a system with a disconnectable link, allowing remote unhooking or disconnection of the link between both half cowls when the lock system is in the unlocking position.

According to a feature, the nacelle further includes lower locking means positioned on the free lower edges of the half cowls opposite to the upper edges and designed for keeping the half cowls closed, said lower locking means being actuated by a lower locking handle positioned on one of said lower edges and movable between a locking position and an unlocking position of the lower locking means, the means for actuating the lock system include an actuation handle connected to the hook and positioned on one of the lower edges of the half cowls, said actuation handle being movable between a position for locking the hook and a position for unlocking it, and the lower locking handle and the actuation handle are positioned relatively to each other so that the lower locking handle prevents maneuvering of the actuation handle and blocks it in its locking position as long as said lower locking handle is in its locking position.

In a particular form, the upper edges of the half cowls support abutments which will bear against each other in a junction plane of the half cowls when they are in the closed position and the hooking-up member of the lock system is fixedly mounted on the upper edge of the relevant half cowl and substantially extends in said junction plane.

Alternatively, the upper edges of the half cowl support abutments which will bear against each other in a junction plane of the half cowls when they are in the closed position, and the hooking-up member of the lock system is mounted on the upper edge of the relevant half cowl via a locking connecting rod having a first jointed portion on said upper edge and a second movable portion relatively to the first portion and supporting said hooking up member, so that said hooking-up member extends in a plane laterally shifted relatively to the junction plane.

This second portion of the locking connecting rod advantageously has guiding means mounted on the pylon.

For this form with a lock system, the present disclosure also relates to the features hereafter:

the lock system is a system with a centered hook, i.e. the hook is located substantially in the junction plane between both half cowls;

the lock system is a system with an excentered hook, i.e. the hook is transversely shifted relatively to the junction plane between both half cowls, while being closer to one of the half cowls than to the other.

Advantageously, when a lock system with an actuator is used, the stress absorbing device is positioned as close as possible to the internal face of the pylon, and more particularly to the internal face of the upstream portion of the pylon, with a substantially balanced distribution of the hooking-up points of the stress absorbing device on the half cowls and of the joint points of the half cowls on the pylon. In this way, the kinematics of the maneuver for locking/unlocking the stress absorbing device shows that it will not be brought closer or by only very little to the internal face of the pylon regardless of the opening range of the half cowls.

Further areas of applicability will become apparent from the description provided herein. It should be understood that the description and specific examples are intended for purposes of illustration only and are not intended to limit the scope of the present disclosure.

DRAWINGS

Other features and advantages of the present disclosure will become apparent upon reading the detailed description hereafter, of several non-limiting exemplary applications, made with reference to the appended drawings wherein.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A nacelle 1 according to the present disclosure is of the same type as the one described above with reference to FIGS. 1 to 3, except that it further includes a device for absorbing circumferential stresses, like one of the stress absorbing devices, 6, 7, 8, 9, 10 respectively illustrated in FIGS. 6 to 9.

Figure 4:
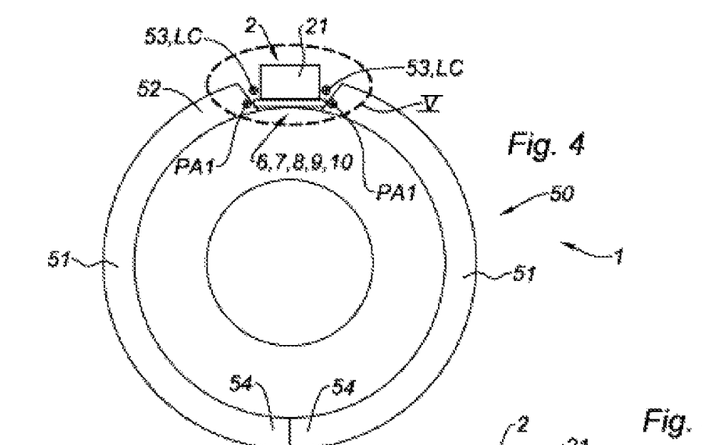
FIG. 4 is a schematic cross-sectional view of a nacelle according to the present disclosure, in a sectional plane of the thrust reverser.
Figure 5:
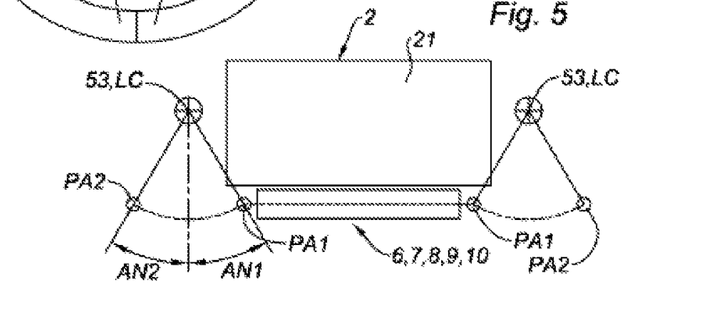
FIG. 5 is an enlarged view of the area v of FIG. 4.

Generally, the stress absorbing device 6, 7, 8, 9, 10 connects together the upper edges 52 of the half cowls 51 of the thrust reverser 50, and is therefore located in the upper portion of the nacelle 1, otherwise at 12 o'clock, as visible in FIGS. 4 and 5.

The stress absorbing device 6, 7, 8, 9, 10 is located in an area Z (illustrated in FIG. 3) below the upstream portion 21 of the pylon 2, above or close to the external line LE of the ring shaped vein and shifted relatively to the hinge lines LC, so that this stress absorbing device 6, 7, 8, 9, 10 is inserted between the external line LE of the ring shaped vein and the two hinge lines LC and is sufficiently close to the upstream end of the half cowls 51, as close as possible to the tie of the half cowls 51 on the fan case 41 in order to be able to absorb the stresses which would tend to separate these half cowls 51 from each other.

Generally, the stress absorbing device 6, 7, 8, 9, 10 is shaped in order to occupy:
- a locking configuration/position in which it locks the half cowls 51 in a closed position; and
- an unlocking configuration/position in which it allows or authorizes the opening of the half cowls 51.

As visible in FIGS. 4 and 5, the stress absorbing device 6, 7, 8, 9, 10 is positioned as close as possible to the internal face of the pylon 2, and more particularly to the internal face of the upstream portion 21 of the pylon 2, with a substantially balanced distribution of the hooking up points PA1, PA2 of the stress absorbing device 6, 7, 8, 9, 10 on the half cowls 51 (and more specifically on the other edges 52 of the half cowls 51) and the joint points 53 of the half cowls 51 on the pylon 2. The hooking up points are referenced as PA1 when the stress absorbing device is in the locking configuration/position and the half cowls 51 are in the closed position, and are referenced as PA2 when the stress absorbing device is in an unlocking configuration/position and the half cowls 51 are in the open position.

This balance is expressed by the fact that the displacement angles AN1 and AN2 between the points PA1 and PA2 relatively to the vertical passing through the corresponding joint point 53 are substantially equal.

According to a first form illustrated in FIGS. 6a to 6g, the stress absorbing device 6 is made in the form of an actuator system with constant links and clutching.

Figure 6A:
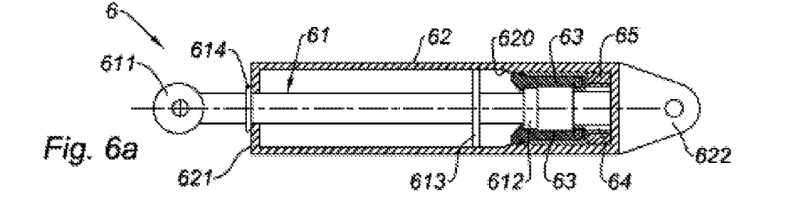
FIGS. 6a to 6g are schematic sectional views of a first stress absorbing device for a nacelle according to the present disclosure, in different positions or configurations.

This stress absorbing device 6 includes an actuator equipped with a rod 61 slidably mounted in a hollow body 62 between a retracted position in the body 62 and a deployed position out of the body 62.

The rod 61 has a first jointed end 611 on the upper edge of one of the half cowls and a second opposite end 612 extending into the body 62; this first end 611 forming an anchoring point for the stress absorbing device 6 on one of the half cowls. The second end 612 of the rod 6 has a protrusion. Two respectively internal 613 and external 614 abutments are attached on the rod 61 so as to limit the displacement thereof, whether this be in the extension direction (displacement towards the deployed position) or in the retract direction (displacement towards the retracted position).

The body 62 has a first end 621 provided with an orifice for letting through the rod 61 and a second solid jointed opposite end 622 on the upper edge of the other half cowl; this second end 622 forming an anchoring point of the stress absorbing device 6 on the other half cowl. The body 62 has on its internal face a step or recess 620, for example made as a reduction in the thickness from the second end 622 to the first end 621 of the body 62; this step or recess 620 has a ramp shape and is located at a predetermined distance from the second end 622 of the body 62.

The stress absorbing device 6 further includes locking/unlocking means cooperating with the rod 61 in order to lock/unlock the rod 61 in the retracted position. These locking/unlocking means include:
- a part forming a hook 63 positioned in the bottom of the body 62, opposite to its first end 621, and designed for cooperating with the protrusion of the second end 612 of the rod 61 in order to block the latter in its retracted position, this part forming a hook 63 being movable in the body 62 between a position for blocking the rod 61 and a position for unblocking it; and
- driving means 64, 65 designed for driving the displacement of the part forming a hook 63 between the blocking and unblocking positions and vice versa.

Of course other locking/unlocking means may be contemplated, such as for example a screw/nut system not shown.

The part forming a hook 63 includes at least two fingers having first free ends with the shape of a hook adapted so as to grasp and block the protrusion of the second end 612 of the rod 61.

The driving means include a slider 64 on which are pivotally mounted the fingers of the part forming a hook 63 and a translational displacement system (not shown) for the slider 64, such as a motor (preferably an electric motor) or a remotely actuated manual system, such as for example a cable device driven by rotation or by traction. The fingers of the part forming a hook 63 have second ends, opposite to the first end, jointed on the slider 64.

The slider 64 may for example have an external threading and be mounted inside a nut 65 positioned in the bottom of the body 62; this nut 65 being driven into rotation, for example by a rotary motor, thereby leading to translational movement of the slider 64.

The principle of this first form includes unlocking the blocking means, in this case the part forming a hook 63 of the rod 61, in order to let the rod 61 be freely displaced during the maneuver for opening at least one of the two half cowls of the thrust reverser. During the maneuver for closing the half cowls, the locking/unlocking means of the stress absorbing device are put into action at the end of the closing of the half cowls in order to end this closing maneuver and to finally lock the half cowls in the closed position by locking the rod 61 in its retracted position.

The operation of this stress absorbing device 6 is described hereafter with reference to FIGS. 6a to 6g which illustrate successive configurations of the stress absorbing device 6.

FIG. 6a illustrates the stress absorbing device 6 in a locking configuration, when the half cowls are in the closed position, when the rod 61 is in a retracted position with the fingers of the part forming a hook 63 which hook up the protrusion of the second end 612 of the rod 61, thereby blocking the rod 61 in the extend direction (towards the left in the figure); the external abutment 614 bearing against the first end 621 of the body 62, thereby blocking the rod 61 in the retract direction (towards the right in the figure).

Figure 6B:
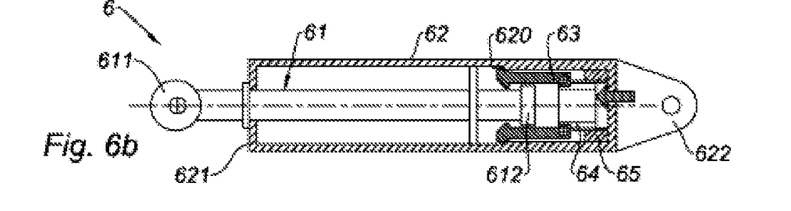

FIG. 6*b* illustrates the beginning of the maneuver for unlocking the stress absorbing device 6, concomitantly at the beginning of the maneuver for opening one or both half cowls, where the slider 64 begins to move towards the first end 621 of the body 62, as schematized by the arrow CS, leading to the displacement of the fingers of the part forming a hook 63 towards the step or recess 620 provided on the internal face of the body 62; the fingers of the part forming a hook 63 being detached from the protrusion of the second end 612 of the rod 61.

Figure 6C:
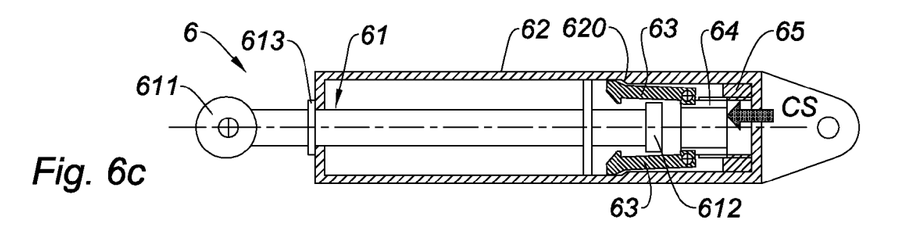

FIG. 6*c* illustrates the unlocking of the stress absorbing device 6, wherein the slider 64 is moved until the fingers of the part forming a hook 63 reach and engage into the step or recess 620 provided on the internal face of the body 62 and which are moved apart from each other according to an opening movement of the petal type, by means of an elastic member (not shown) shaped so as to separate and move away the fingers of the part forming a hook 63 from each other; the separation of the fingers of the part forming a hook 63 is such that, from now on, these fingers can no longer cooperate with the protrusion of the second end 612 of the rod 61 and thus can no longer block the rod 61, so that the rod 61 is free to be displaced in the extend direction.

Figure 6D:
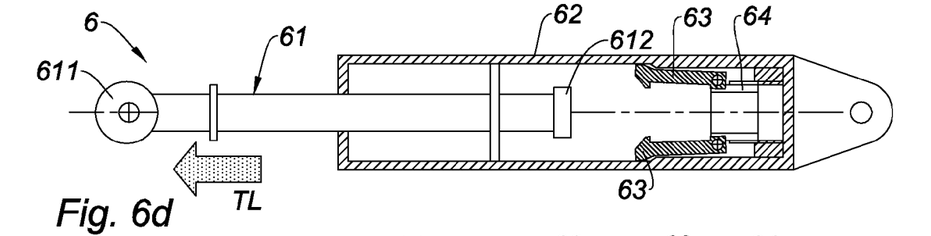

FIG. 6*d* illustrates the stress absorbing device 6 which is unlocked during the opening of the half cowls of the thrust reverser, wherein said stress absorbing device 6 allows this opening of the half cowls. The rod 61 is from now on free of any rectilinear movement, as schematized by the arrow TL, and the actuator acts like a simple piston without any maneuvering stress during the opening of the half cowls.

Figure 6E:
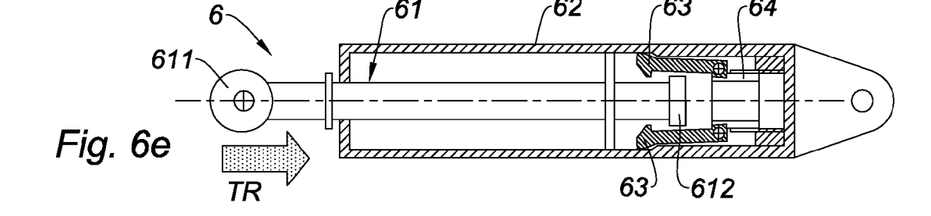

FIG. 6*e* illustrates the stress absorbing device 6 which is unlocked during the closing of the half cowls of the thrust reverser. Upon closing the half cowls, the rod 61 enters the body 62 as schematized by the arrow TR, until it reaches a transient position close to the locking position as illustrated in FIGS. 6*a* and 6*b*, wherein the external abutment 614 does not yet bear against the first end 621 of the body 62. Indeed, certain parameters ensure that the rod 61 cannot be repositioned alone in abutment at the end of travel, such that the flexibility of the structure, the seal gaskets, the manufacturing and positioning tolerances of the constitutive elements of the stress absorbing device 6. In this transient position, the protrusion of the second end 612 of the rod 61 is positioned inside the fingers of the part forming a hook 63.

Figure 6F:
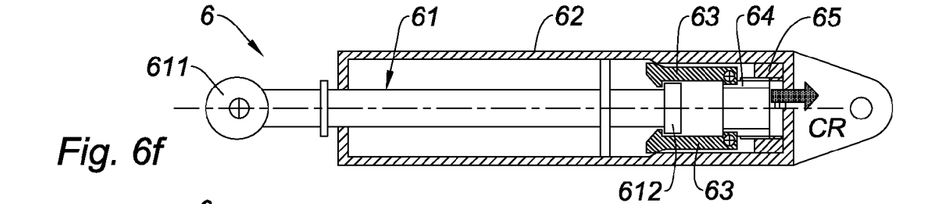

FIG. 6*f* illustrates the beginning of the maneuvering for locking the stress absorbing device 6, wherein the rod 61 is in its transient position and wherein the slider 64 begins to move towards the second end 622 of the body 62, as illustrated by the arrow CR, leading to the displacement of the fingers of the part forming a hook 63 in this same direction, which causes disengagement of the fingers of the part forming a hook 63 out of the step or recess 620 (the ramp shape facilitating this disengagement). Thus, the fingers of the part forming a hook 63 move closer to each other and again close on the protrusion of the second end 612 of the rod 61 in order to block this rod 61; the transient position of the rod 61 is such that a play between the first free hook-shaped ends of the fingers and the protrusion of the rod 61 is provided for allowing the fingers to retract on the rod 61 without any stress. Ensuring proper positioning of the protrusion of the rod 61 with respect to the fingers may be accomplished by any suitable detection means known to one skilled in the art, such as for example a proximity detector.

Figure 6G:
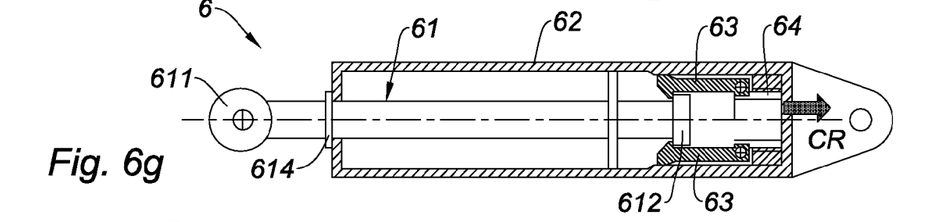

FIG. 6*g* illustrates the end of the maneuver for locking the stress absorbing device 6, wherein the slider 64 ends its displacement towards the second end 622 of the body 62, as schematized by the arrow CR, so that the fingers of the part forming a hook 63 will bear against the protrusion of the second end 612 of the rod 61 and these fingers drive the rod 61 as far as the locking position illustrated in FIGS. 6*a* and 6*b*. Thus, the stress absorbing device 6 continues the rectilinear closing movement of the rod 61 until it abuts at the end of travel. At the end of this movement, the driving means are automatically disconnected and locked in position.

Figure 7A:
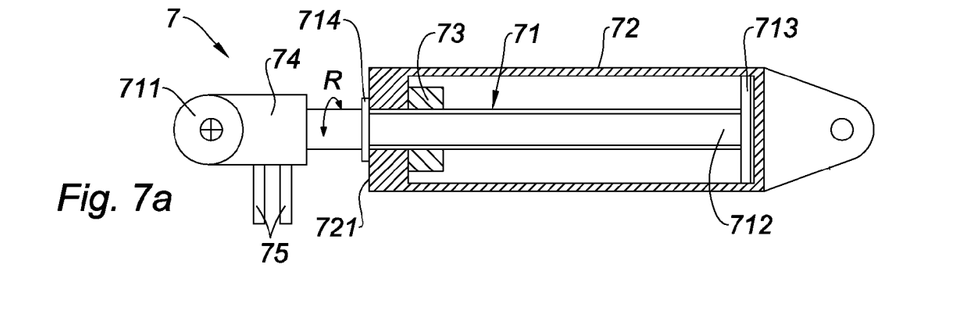
FIGS. 7a and 7b are schematic sectional views of a second stress absorbing device for a nacelle according to the present disclosure, in two different positions or configurations.
Figure 7B:
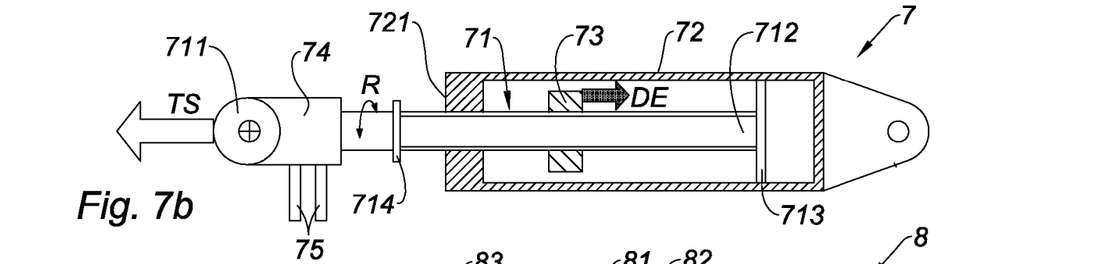

According to a second form illustrated in FIGS. 7*a* and 7*b*, the stress absorbing device 7 is made in the form of an actuator system with constant links and with a screw/nut.

This stress absorbing device 7 includes an actuator equipped with a rod 71 at least partly threaded and slidably mounted in a hollow body 72 between a retracted position of the body 72 and a deployed position out of the body 72.

The rod 71 has a first jointed end 711 on an upper edge of one of the half cowls and a second opposite end 712 extending into the body 72; this first end 711 forming an anchoring point of the stress absorbing device 7 on one of the half cowls. Two respectively internal 713 and external 714 abutments are attached on the rod 71 for limiting the displacement thereof, whether this is at the exit or at the entrance; the internal abutment 713 being attached onto the second end 712 of the rod 71.

The stress absorbing device 7 further includes locking/unlocking means cooperating with the rod 71 for locking/unlocking the rod 71 in the retracted position. These locking/unlocking means include:
- a nut 73 mounted on the threading of the rod 71 inside the body 72; and
- a rotary motor 74 designed for driving the rod 71 into rotation, wherein the rotary motor 74 is controlled, via links 75, by a system (not shown) for opening both half cowls of the thrust reverser so that the speed of rotation of the rod 71 imposed by the rotary motor 74 allows the nut 73 to be driven into translation more rapidly than upon opening of both half cowls by the opening system.

The principle of this second form consists of unlocking the locking means, in this case the nut 73, of the rod 71, in order to let the rod 71 be freely displaced during the maneuver for opening at least one of the two half cowls of the thrust reverser. During the maneuver for closing the half cowls, the locking/unlocking means of the stress absorbing device 7 are put into action at the end of the closing of the half cowls in order to end this closing maneuver and to finally lock the half cowls in the closed position by locking the rod 71 in its retracted position.

In this second form, the locking/unlocking of the stress absorbing device 7 is accomplished in synchronization with the opening/closing of the half cowls achieved by the opening system. In this second form, the rod 71 freely slides through the body 72 with the association of the nut 73 stopped in translation between the first end 721 of the body 72 and the internal abutment 713 provided on the rod 71. In an alternative not shown, the rod is directly screwed through the body, more specifically on the first end of the body.

The operation of this stress absorbing device 7 is described hereafter with reference to the FIGS. 7*a* and 7*b* which illustrate two successive configurations of the stress absorbing device 7.

FIG. 7*a* illustrates the stress absorbing device 7 in the locking configuration, when the half cowls are in the closed position, wherein the rod 71 is in a retracted position, with the nut 73 in abutment against the first end 721 of the body 72 thereby blocking the rod 71 in the extend direction (towards the left in the figure) and with the external abutment 714 bearing against the first end 721 of the body 72 thereby blocking the rod 71 in the retract direction (towards the right in the figure).

FIG. 7b illustrates the maneuver for unlocking the stress absorbing device 7, concomitantly to the maneuver for opening one or both half cowls, wherein the system for opening the half cowls controls the rotary motor 74 for driving the rod 71 into rotation (as schematized by the arrow R) with a speed greater than that for the opening of the half cowls, causing displacement of the nut 73 towards the second end 712 of the rod 71, as schematized by the arrow DE. The nut 73 is then detached from the first end 721 of the body 72, consequently allowing exit of the rod 71. The speed difference ensures that the nut 73 moves away more rapidly from the first end 721 of the body 72, the rod 71 is displaced towards the exit, in other words towards the deployed position; the purpose being to avoid that the nut 73 interferes with this rod 71 exit and therefore with the opening of the half cowls.

The length of the rod 71 is defined so that the nut 73 will not come into contact with the internal abutment 713 provided on the second end 712 of the rod 71 before the end of the complete opening of the half cowls of the thrust reverser. Thus, the actuator may maneuver without any stress during the opening of the half cowls.

The maneuver for locking the stress absorbing device 7 is carried out concomitantly with the maneuver for closing the half cowls, on the same principle as described below with the rod 71 which enters the body 72, the rotary motor 74 turns in the other direction and the nut 73 comes back into contact with the first end 721 of the body 72.

According to a third form illustrated in FIGS. 8a to 8f, the stress absorbing device 8 is also made in the form of an actuator system with constant links and with a screw/nut.

Figure 8A:
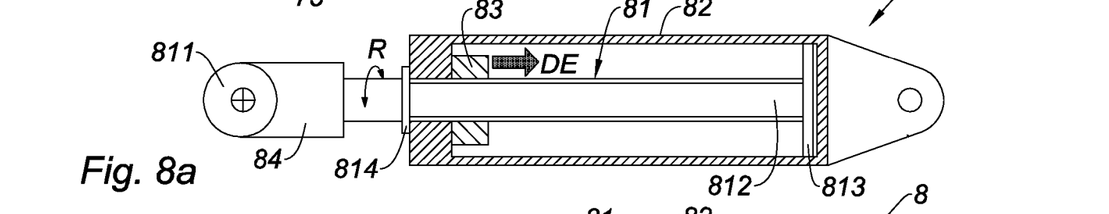
FIGS. 8a to 8f are schematic sectional views of a third stress absorbing device for a nacelle according to the present disclosure, in different positions or configurations.

This stress absorbing device 8 includes an actuator equipped with an at least partly threaded rod 81 and slidably mounted in a hollow body 82 between a retracted position of the body 82 and a deployed position out of the body 82.

The rod 81 has a first jointed end 811 on the upper edge of one of the half cowls and a second opposite end 812 extending into the body 82; this first end 811 forming an anchoring point of the stress absorbing device 8 on one of the half cowls. Two respectively internal 813 and external 814 abutments are attached on the line 81 for limiting displacement thereof, whether this be at the exit or at the entrance; the internal abutment 813 being mounted on the second end 812 of the rod 81.

The stress absorbing device 8 further includes locking/unlocking means cooperating with the rod 81 for locking/unlocking the rod 81 in the retracted position. These locking/unlocking means include:
 a nut 83 mounted on the threading of the rod 81 inside the body 82; and
 a rotary motor 84 designed for driving the rod 81 into rotation.

Unlike the second form, this rotary motor 84 of the third form is independent of a system for opening both half cowls of the thrust reverser. The rotary motor 84 may be of the type with an electric or manual drive.

The principle of this third form includes unlocking the blocking means, in this case the nut 83 of the rod 81, in order to let the rod 81 be freely displaced and allow the maneuver for opening at least one of the two half cowls of the thrust reverser. During the maneuver for closing the half cowls, the locking/unlocking means of the stress absorbing device 8 are put into action at the end of the closing of the half cowls in order to end this closing maneuver and to finally lock the half cowls in the closed position by locking the rod 81 in its retracted position, by bringing back the nut 83 into abutment against the first end 821 of the body 82.

In this third form, the locking/unlocking of the stress absorbing device 8 is achieved sequentially as compared with the opening/closing of the half cowls achieved by the system for opening the half cowls. In this third form, the rod 81 freely slides through the body 82 with the association of the nut 83 stopped in translation between the first end 821 of the body 82 and the internal abutment 813 provided on the rod 81.

The operation of this stress absorbing device 8 is described hereafter with reference to FIGS. 8a to 8f which illustrate successive configurations of the stress absorbing device 8.

FIG. 8a illustrates the stress absorbing device 8 in the locking configuration, when the half cowls are in a closed position, wherein the rod 81 is in a retracted position, with the nut 83 in abutment against the first end 821 of the body 82 thereby blocking the rod 81 in the extend direction (towards the left in the figure), and with the external abutment 814 bearing against the first end 821 of the body 82 thereby blocking the rod 81 in the retract direction (towards the right in the figure).

In order to initiate the maneuver for unlocking the stress absorbing device 8, prior to the maneuver for opening one or both half cowls, the rotary motor 84 is actuated and drives the rod 81 into rotation (as schematized by the arrow R), driving the displacement of the nut 83 towards the second end 812 of the rod 81, as schematized by the arrow DE.

Figure 8B:
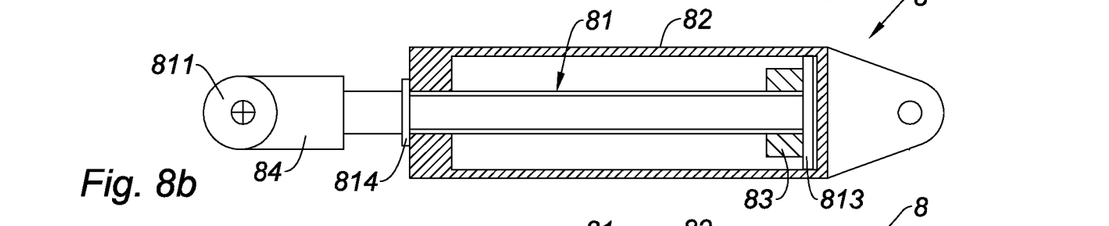

FIG. 8b illustrates the ends of the maneuver for unlocking the stress absorbing device 8, wherein the nut 83 has been displaced by an unlocking maneuver, until it bears against the internal abutment 813 provided on the second end 812 of the rod 81. If the motor 84 has an electric drive, the latter is no longer powered at the end of this unlocking maneuver.

Figure 8C:
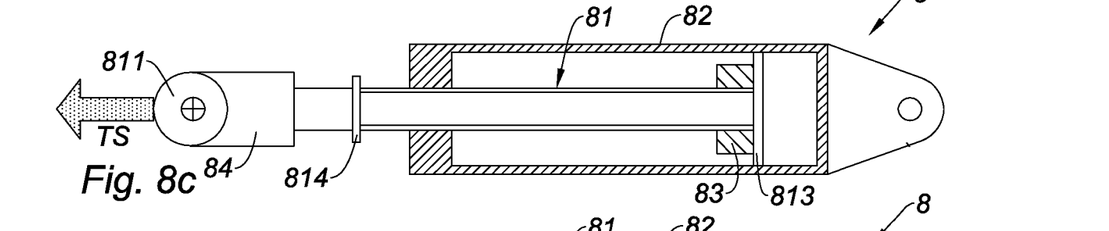

FIG. 8c illustrates the stress absorbing device 8 in the unlocked configuration allowing the opening of the half cowls of the thrust reverser. Once the stress absorbing device 8 is in the unlocking configuration, the maneuver for opening the half cowls is engaged, the rod 81 being free to be freely displaced and to exit from the body 82 along a rectilinear movement, as illustrated by the arrow TS. The actuator then acts as a simple piston without any maneuvering stress during the opening of the half cowls, the nut 83 remains bearing against the internal abutment 813.

Figure 8D:
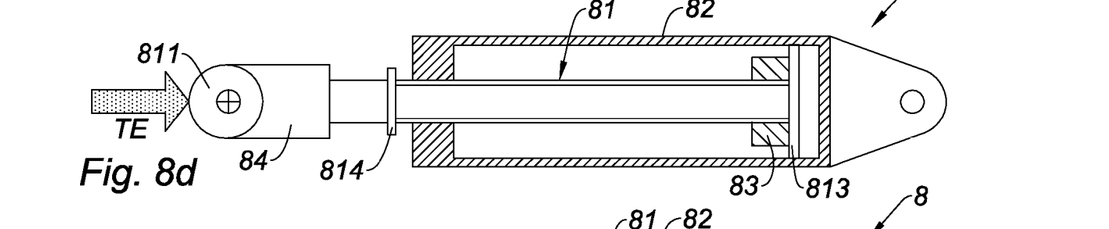

FIG. 8d illustrates the stress absorbing device 8 in the unlocked configuration allowing the closing of the half cowls of the thrust reverser. The maneuver for closing the half cowls is engaged, the rod is free to be freely displaced and to enter the body 82 along a rectilinear movement, as schematized by the arrow TE. The actuator still acts as a simple piston without any maneuvering stress during the closing of the half cowls, the nut 83 still remains bearing against the internal abutment 813. The rod 81 enters the body 82 until it reaches a transient position close to the locking position illustrated in FIGS. 8a and 8b, wherein the external abutment 814 does not yet bear against the first end 821 of the body 82. Indeed, certain parameters ensure that the rod 81 cannot be repositioned by itself in abutment at the end of travel, such as the flexibility of the structure, the seal gaskets, the manufacturing and positioning tolerances of the constitutive members of the stress absorbing device 8.

Figure 8E:
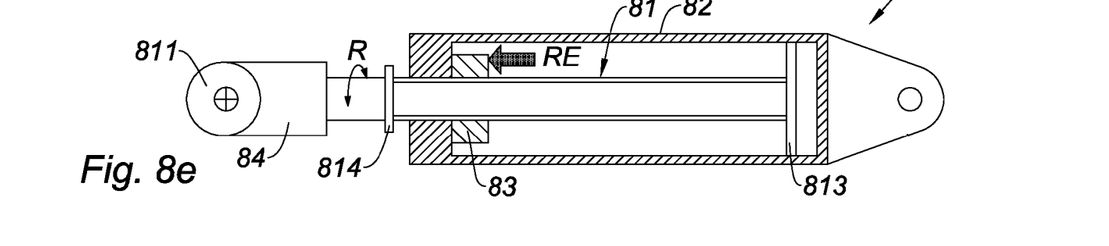

FIG. 8e illustrates the beginning of the maneuver for locking the stress absorbing device 8, wherein the rod 61 is in its transient position and wherein the rotary motor 84 drives the rod 81 into rotation, in the opposite direction with respect to the previous one, so that the nut 83 begins to move towards the first end 821 of the body 82, as schematized by the arrow RE, leading this nut 83 to bearing against this first end 821 of the body 82.

Figure 8F:
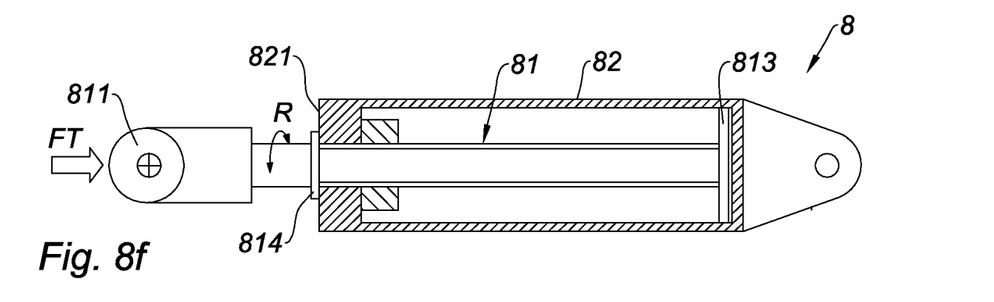

FIG. 8*f* illustrates the end of the maneuver for locking the stress absorbing device 8, wherein the rotary motor 84 continues to rotate the rod 81 so that the nut 83 will tighten the external abutment 814 against the first end 821 of the body 82. Thus, the rod 81 returns to its locked position with the nut 83 in abutment against the first end 821 of the body 82 thereby blocking the rod 81 in the extend direction, and with the external abutment 814 bearing against the first end 821 of the body 82 thereby blocking the rod 81 in the retract direction. At the end of this movement, the rotary motor is automatically disconnected and locked in position.

According to a fourth form illustrated in FIGS. 9*a* to 9*d*, the stress absorbing device 9 is made in the form of a centered system with a disconnectable link.

Figure 9A:
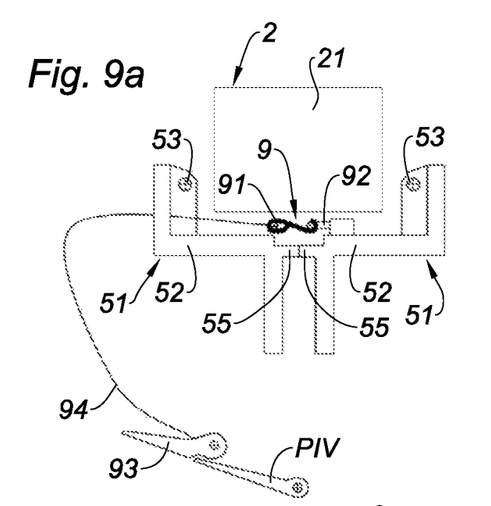
FIGS. 9a to 9d are schematic sectional views of a fourth stress absorbing device for a nacelle according to the present disclosure, in different positions or configurations.

This stress absorbing device 9 includes a system with a lock approximately positioned in a middle plane of the nacelle, substantially corresponding to the junction plane of both half cowls 51 of the thrust reverser. This lock system includes:
- a hook 91 mounted on the upper edge 52 of one of the half cowls 51;
- a hooking-up member 92 mounted on the upper edge 52 of the other half cowl 51, the hook 91 being movable between a locking position in which the hook 91 cooperates with restraint with the hooking-up member 92 in the closed or substantially closed position of the half cowls 51, and an unlocking position in which the hook 92 does not cooperate with the hooking-up member 92 and allows opening of the half cowls 51; and
- means 93, 94 for actuating the hook 92 between the locking and unlocking positions.

The upper edges 52 of the half cowls 51 support abutments 55 which bear against each other in the junction plane of the half cowls 51 when they are in the closed position. The hooking up member 92 of the lock system is fixedly mounted on the upper edge 52 of the relevant half cowls 51 and substantially extends in this junction plane.

The actuation means may be shaped so as to electrically or manually (mechanically) actuate the lock system remotely. In the example illustrated in FIGS. 9*a* to 9*d*, the actuation is manual and is carried out by a return through a cable 94 on an actuation handle 93 positioned in the lower portion of the nacelle (at 6 o'clock). In other words the means for actuating the lock system includes the actuation handle 93 connected to the hook 91 through a cable control system 94, this actuation handle 93 being positioned on one of the lower edges (not visible) of the half cowls 51. The actuation handle 93 is movable between a position for locking the hook 91 and a position for unlocking it.

In the example illustrated in FIGS. 9*a* to 9*d*, the nacelle further includes lower locking means (not visible and notably of the lock type) positioned on free lower edges of the half cowls 51 and designed so as to keep the half cowls 51 closed, so that these lower locking means are positioned in the lower portion of the nacelle (at 6 o'clock). These lower locking means are actuated by a lower locking handle PIV positioned on one of these lower edges, in other words in the lower portion of the nacelle (at 6 o'clock), and this lower locking handle PIV is movable between a locking position and an unlocking position of the lower locking means.

As explained hereafter, the lower locking handle PIV and the actuation handle 93 are positioned relatively to each other so that the lower locking handle PIV prevents maneuvering of the actuation handle 93 and blocks it in its locking position as long as this lower locking handle PIV is in its locking position. Also, closing again the half cowls 51 of the thrust reverser can only be accomplished when the locking is carried out (hook 91 in the locking position) with the actuation handle 93 closed in the locking position.

The operation of this stress absorbing device 9 is described hereafter with reference to FIGS. 9*a* to 9*d* which illustrate successive configurations of the stress absorbing device 9 and of the half cowls 51.

FIG. 9*a* illustrates the stress absorbing device 9 in the locking configuration with the half cowls 51 in the closed position, wherein the hook 91 restrainedly cooperates with the hooking-up member 92, the actuation handle 93 is in the locking position, and the lower locking handle PIV is in the locking position so that it prevents maneuvering of the actuation handle 93. The hook 91 is advantageously provided for locking three protruding points in order to guarantee the safety of the locking.

Figure 9B:
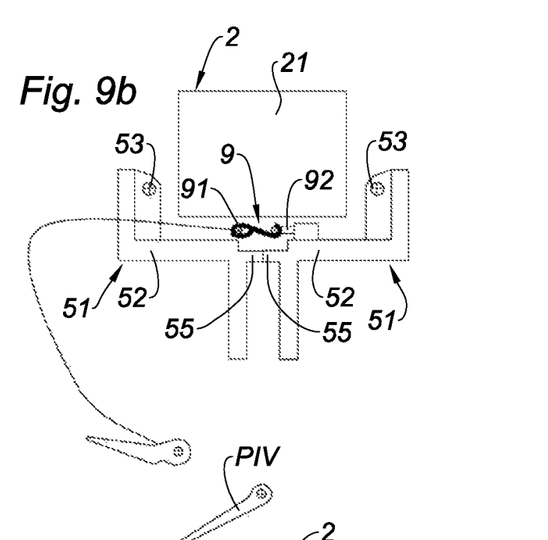

FIG. 9*b* illustrates the beginning of the maneuver for opening the half cowls 51, with the stress absorbing device 9 still in the locking configuration and the half cowls 51 still in a closed position, wherein the hook 91 still restrainedly cooperates with the hooking up member 92, the actuation handle 93 is still in the locking position and the lower locking handle PIV is now in the unlocking position. In spite of the unlocking of the lower locking means, the half cowls 51 cannot yet be opened since the stress absorbing device 9 in the unlocking position in a locking configuration.

Figure 9C:
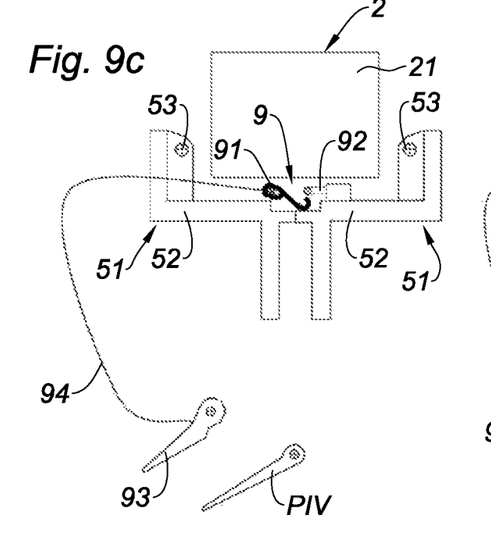

FIG. 9*c* illustrates the continuation of the maneuver for opening the half cowls 51, wherein the actuation handle 93 has switched into its unlocking position, following the switching beforehand of the lower locking handle PIV into its unlocking position. Accordingly, the hook 91 disengages from the hooking up member 92 and the stress absorbing device 9 passes into the unlocking configuration.

Figure 9D:
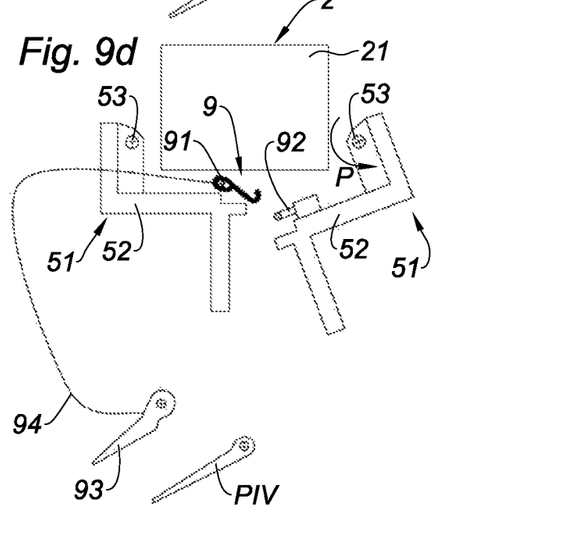

FIG. 9*d* illustrates the end of the maneuver for opening the half cowls 51, wherein at least one of the half cowls 51 may open by pivoting around its jointing points 53, as illustrated by the arrow P, since the stress absorbing device 9 is in the unlocking position, just like the lower locking means.

According to a fifth form illustrated in FIGS. 10*a* to 10*d*, the stress absorbing device 10 is made in the form of a decentered system with a disconnectable link.

Figures 10A, 10B, 10C, 10D:
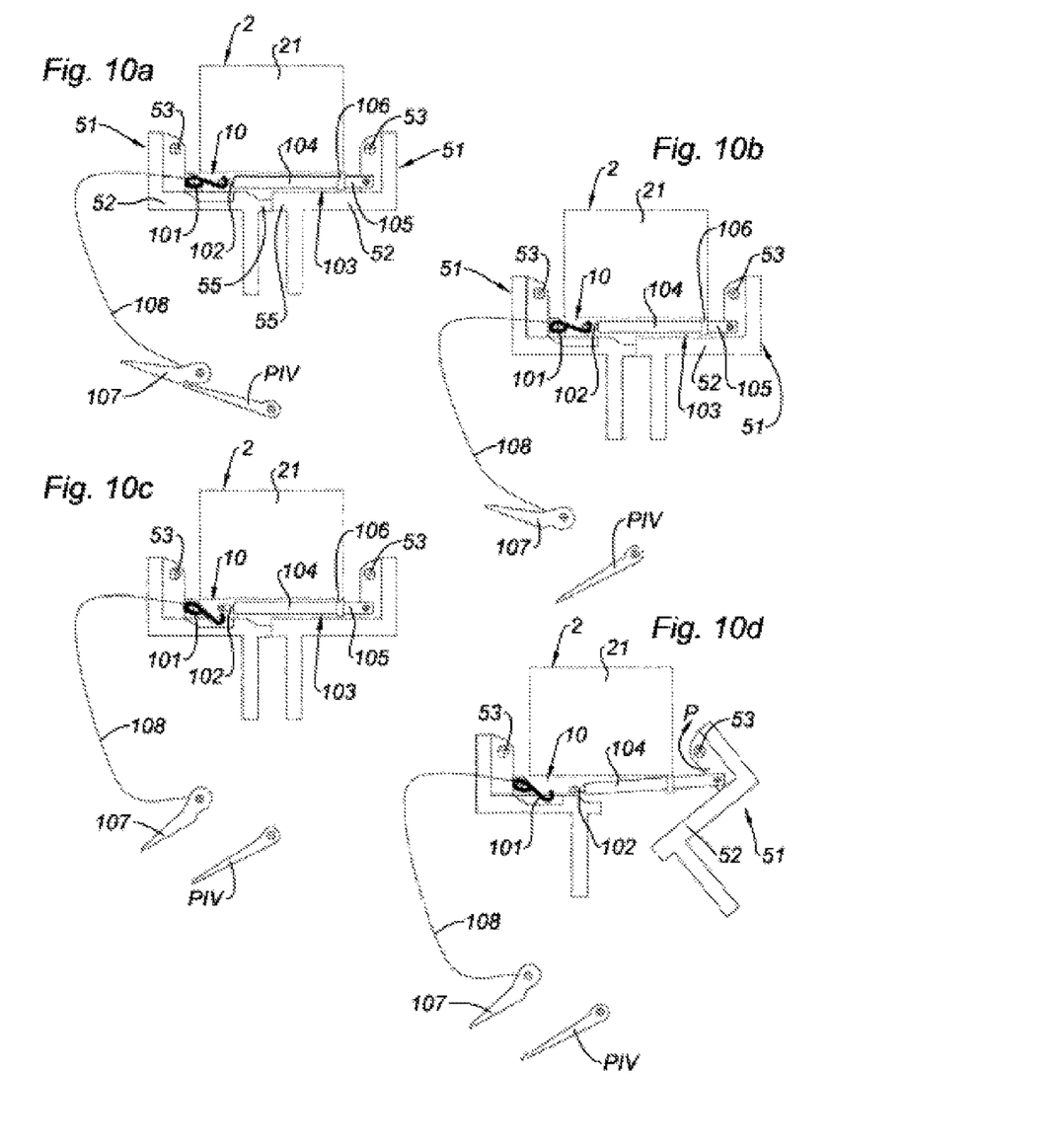
FIGS. 10a to 10d are schematic sectional views of a fifth stress absorbing device for a nacelle according to the present disclosure in different positions or configurations.

This stress absorbing device 10 includes a shifted lock system relatively to a middle plane of the nacelle substantially corresponding to the junction plane of the two half cowls 51 of the thrust reverser. This lock system includes:
- a hook 101 mounted on the upper edge 52 of one of the half cowls 51, in a side portion relatively to the junction plane of the half cowl 51, advantageously in a reinforced area of the relevant half cowl 51;
- a hooking up member 102 mounted on the upper edge 52 of the upper half cowl 51, the hook 101 being movable between a locking position in which the hook 101 restrainedly cooperates with the hooking-up member 102 in the closed or substantially closed position of the half cowls 51, and an unlocking position in which the hook 102 does not cooperate with the hooking-up member 102 and allows the opening of the half cowls 51; and
- actuation means 107, 108 of the hook 101 between the locking and unlocking positions.

The upper edges 52 of the half cowls 51 support abutments 55 which will bear against each other in the junction plane of the half cowls 51 when they are in a closed position. The hooking¬ up member 102 of the lock system is mounted on the upper edge 52 of the relevant half cowl 51 via a locking connecting rod 103 having a first jointed portion 105 on this upper edge 52 and a second movable portion 104 relatively to the first portion 105 and supporting the hooking-up member 102, so that this hooking-up member 102 extends in a plane laterally shifted with respect to the junction plane. The second portion 104 of the locking connecting rod 103 has guiding means 106 mounted on the pylon 2. The locking connecting rod 103 is thus jointed around its hooking up point on the half cowl 51 (at its first portion 105), and it is guided in its kinematics by the guiding means 106 which may be borne by the pylon 2. The hooking-up member 102, mounted on the locking connecting rod 103 remains close to the structure of the pylon 2 through the guiding means 106 upon opening the half cowls 51 in order to avoid any interference with the surrounding structures. The arrangement of the guiding means 106 is provided for allowing the hook 101 to grasp or catch without any stress the hooking-up member 102 upon closing the half cowls 51 again.

The actuation means may be shaped so as to electrically or manually (mechanically) actuate the lock system remotely. In the example illustrated in the FIGS. 10a to 10d, the actuation is manual and is carried out by a return via a cable 108 onto an actuation handle 107 positioned in the lower portion of the nacelle (at 6 o'clock). In other words, the means for actuating the lock system include the actuation handle 107 connected to the hook 101 through a cable control system 108, this actuation handle 108 being positioned on one of the lower edges (not visible) of the half cowls 51. The actuation handle 107 is movable between a position for locking the hook 101 and a position unlocking it.

In the example illustrated in FIGS. 10a to 10d, just like the one of FIGS. 9a and 9d, the nacelle further includes lower locking means (not visible and notably of the lock type) positioned on the free lower edges of the half cowls 51 and designed so as to keep the half cowls 51 closed, so that these lower locking means are positioned in the lower portion of the nacelle (at 6 o'clock). These lower locking means are actuated by a lower locking handle PIV positioned on one of these lower edges, in other words in the lower portion of the nacelle (at 6 o'clock), and this lower locking handle PIV is movable between a locking position and an unlocking position of the lower locking means.

As explained hereafter, the lower locking handle PIV and the actuation handle 107 are positioned relatively to each other so that the lower locking handle PIV prevents the maneuvering of the actuation handle 107 and blocks it in its locking position as long as this lower locking handle PIV is in its locking position.

The operation of this stress absorbing device 10 is described hereafter with reference to FIGS. 10a to 10d which illustrates successive configurations of the stress absorbing device 10 and of the half cowls 51.

FIG. 10a illustrates the stress absorbing device 10 in the locking configuration with the half cowls 51 in the closed position, wherein the hook 101 restrainedly cooperates with the hooking-up member 102, the actuation handle 107 is in the locking position and the lower locking handle PIV is in the locking position so that it prevents maneuvering of the actuation handle 107. The locking connecting rod 103 is in the closed position.

FIG. 10b illustrates the beginning of the maneuvering for opening the half cowls 51, with the stress absorbing device 10 still in the locking configuration and the half cowls 51 still in the closed position, wherein the hook 101 still restrainedly cooperates with the hooking-up member 102, the actuation handle 107 is still in the locking position, the locking connecting rod 103 is still in the closed position and the lower locking handle PIV is now in the unlocking position. In spite of the unlocking of the lower locking means, the half cowls 51 cannot yet open since the stress absorbing device 10 in the unlocking position is in a locking configuration.

FIG. 10c illustrates the continuation of the maneuvering for opening the half cowls 51, wherein the actuation handle 107 has switched into its unlocking position, following the switching beforehand of the lower locking handle PIV into its unlocking position. Accordingly, the hook 101 disengages from the hooking-up member 102 and the stress absorbing device 10 passes into an unlocking configuration with the locking connecting rod 103 still in the closed position.

FIG. 10d illustrates the end of the maneuvering for opening the half cowls 51, wherein at least one of the half cowls 51 may open by pivoting around its jointing point 53, as schematized by the arrow P, since the stress absorbing device 10 is in an unlocking configuration, just like the lower locking means, the locking connecting rod 103 passing into the open position with relative displacement of the first and second portions 105, 104 of the connecting rod 103 concomitantly with the pivoting of the first portion 105 of the connecting rod 103 with the guidance on the pylon 2.

Of course, the exemplary application mentioned above does not have any limiting nature and other improvements and details may be brought to the nacelle according to the present disclosure without however departing from the scope of the invention wherein other forms of stress absorbing devices may be achieved.

What is claimed is:

1. A nacelle for a turbojet engine of an aircraft, including:
a fan case surrounding a fan upstream from the turbojet engine, said fan case being surrounded by an external fan cowl and being attached on a pylon for supporting the nacelle;
an internal structure positioned upstream from the fan case and surrounding the turbojet engine; and
a thrust reverser positioned downstream from the fan case and comprising a cowl defining with the internal structure a ring shaped vein for letting through an airflow, said cowl delimiting an external line of said ring shaped vein and including two removable half cowls respectively having upper edges equipped with hinges that bin the two removable half cowls on the pylon, said hinges being shaped as to allow pivoting of the two removable half cowls between closed and open positions around respective longitudinal axes forming two hinge lines; and
a device for absorbing circumferential stresses connecting together the upper edges of the two removable half cowls, said stress absorbing device being shaped so as to lock the two removable half cowls in the closed position when said stress absorbing device occupies a locking configuration and for allowing the opening of the two removable half cowls when said stress absorbing device occupies an unlocking configuration,
wherein said stress absorbing device is positioned under an upstream portion of the pylon, upstream from the hinges of the two removable half cowls on the pylon, and is inserted between the external line of the ring shaped vein and the two hinge lines
said stress absorbing device being exclusively attached to the two removable half cowls in order to allow the opening of the two removable half cowls independently of the opening/closing of the external fan cowl,
said stress absorbing device including at least one actuator equipped with a rod slidably mounted on a hollow body between a retracted position in the body and a deployed position out of the body, said rod having a first end permanently attached on the upper edge of one of the two removable half cowls and a second opposite end extending in the body, said body having a first end provided with an orifice for letting through the rod and a second opposite end permanently attached on the upper edge of the other removable half cowl, wherein the actuator further includes a locking/unlocking system cooperating with the rod in order to lock/unlock the rod in the retracted position, said actuator being an actuator system with constant links, wherein said actuator is permanently attached on both two removable half cowls of the thrust reverser.

2. The nacelle according to claim 1, wherein the fan case comprises a downstream end, and the pylon comprises a downstream portion, said downstream end of the fan case being attached to said downstream portion of the pylon by upper fasteners, and wherein the stress absorbing device is positioned between said upper fasteners and the hinges.

3. The nacelle according to claim 1, wherein the locking/unlocking system includes:

a blocking element positioned in the body and cooperating with the rod for blocking said rod in a retracted position of the rod, said blocking element being movably mounted in the body between a blocking position and an unblocking position of the rod; and a driving system designed for driving the blocking element into displacement between the blocking and unblocking positions and vice versa.

4. The nacelle according to claim 3, wherein the blocking element includes at least one hook having a free end designed so as to cooperate with the second end of the rod, said hook being movable in translation in the body between the blocking position in which the free end of the hook cooperates with the second end of the rod and the unblocking position in which the free end of the hook is moved away from the second end of the rod and allows displacement of the rod.

5. The nacelle according to claim 3, wherein the rod is at least partly threaded, the blocking element includes a nut mounted on the threading of the rod inside the body and the driving means include a rotary motor designed for driving the rod into rotation.

6. The nacelle according to claim 5, wherein the rotary motor is controlled by a system for opening the two removable half cowls of the thrust reverser so that the speed of rotation of the rod imposed by the rotary motor allows the nut to be driven in translation more rapidly than the opening of the two removable half cowls by the opening system.

7. The nacelle according to claim 5, wherein the rotary motor is independent of a system for opening the two removable half cowls of the thrust reverser, and the rod has on its second end a part forming an abutment for a nut.

* * * * *